(12) United States Patent
Itoh et al.

(10) Patent No.: US 9,694,325 B2
(45) Date of Patent: Jul. 4, 2017

(54) COMPOSITE GAS SEPARATION MEMBRANES WITH DIALKYSILOXANE INTERMEDIATE LAYER

(71) Applicant: Fujifilm Manufacturing Europe BV, Tilburg (NL)

(72) Inventors: Shigehide Itoh, Tilburg (NL); Yujiro Itami, Tilburg (NL)

(73) Assignee: Fujifilm Manufacturing Europe BV (NL)

( * ) Notice: Subject to any disclaimer, the term of this patent is extended or adjusted under 35 U.S.C. 154(b) by 0 days.

(21) Appl. No.: 14/408,754

(22) PCT Filed: Jun. 26, 2013

(86) PCT No.: PCT/GB2013/051683
§ 371 (c)(1),
(2) Date: Dec. 17, 2014

(87) PCT Pub. No.: WO2014/001794
PCT Pub. Date: Jan. 3, 2014

(65) Prior Publication Data
US 2015/0298071 A1    Oct. 22, 2015

(30) Foreign Application Priority Data

Jun. 26, 2012 (GB) .................................. 1211309.8

(51) Int. Cl.
| | |
|---|---|
| B01D 53/22 | (2006.01) |
| B01D 71/32 | (2006.01) |
| B01D 71/64 | (2006.01) |
| B01D 67/00 | (2006.01) |
| B01D 69/12 | (2006.01) |
| B01D 63/08 | (2006.01) |
| B01D 71/70 | (2006.01) |
| B01D 71/16 | (2006.01) |
| B01D 71/82 | (2006.01) |
| B01D 69/08 | (2006.01) |
| B05D 3/06 | (2006.01) |
| B01D 71/62 | (2006.01) |

(52) U.S. Cl.
CPC .......... *B01D 69/12* (2013.01); *B01D 53/228* (2013.01); *B01D 63/08* (2013.01); *B01D 67/0006* (2013.01); *B01D 67/006* (2013.01); *B01D 67/0081* (2013.01); *B01D 67/0095* (2013.01); *B01D 69/08* (2013.01); *B01D 69/125* (2013.01); *B01D 71/16* (2013.01); *B01D 71/32* (2013.01); *B01D 71/62* (2013.01); *B01D 71/64* (2013.01); *B01D 71/70* (2013.01); *B01D 71/82* (2013.01); *B05D 3/06* (2013.01); *B01D 2053/221* (2013.01); *B01D 2053/224* (2013.01); *B01D 2323/30* (2013.01); *B01D 2323/34* (2013.01); *B01D 2323/345* (2013.01); *B01D 2323/40* (2013.01); *B01D 2325/023* (2013.01); *B01D 2325/04* (2013.01); *B01D 2325/20* (2013.01); *Y02C 10/10* (2013.01)

(58) Field of Classification Search
CPC ............ B01D 53/228; B01D 2053/221; B01D 2053/224; B01D 63/08; B01D 67/0006; B01D 67/006; B01D 67/0081; B01D 67/0095; B01D 69/08; B01D 69/12; B01D 69/125; B01D 71/16; B01D 71/32; B01D 71/62; B01D 71/64; B01D 71/82; B01D 2323/30; B01D 2323/34; B01D 2323/345; B01D 2323/40; B01D 2325/023; B01D 2325/04; B01D 2325/20
USPC .......................................................... 96/13
See application file for complete search history.

(56) References Cited

U.S. PATENT DOCUMENTS

| | | | |
|---|---|---|---|
| 4,230,463 A | 10/1980 | Henis et al. | |
| 4,581,043 A * | 4/1986 | van der Scheer | B01D 71/76 95/51 |
| 5,085,676 A | 2/1992 | Ekiner et al. | |
| 5,286,280 A * | 2/1994 | Chiou | B01D 53/228 95/51 |
| 2004/0050250 A1 | 3/2004 | Pinnau et al. | |
| 2007/0151447 A1 | 7/2007 | Merkel | |
| 2012/0178834 A1* | 7/2012 | Linder | B01D 67/0006 521/27 |
| 2012/0297976 A1* | 11/2012 | Sano | B01D 53/228 95/47 |
| 2014/0287156 A1* | 9/2014 | Kreiter | B01D 67/0037 427/536 |

FOREIGN PATENT DOCUMENTS

| | | |
|---|---|---|
| JP | S58 223411 A | 12/1983 |
| JP | S59 66308 A | 4/1984 |
| WO | 2007018425 A1 | 2/2007 |

OTHER PUBLICATIONS

English language abstract for Japanese Patent Application Publication JP S58-223411. Retrieved from http://worldwide.espacenet.com on Jan. 7, 2016.*
English language abstract for Japanese Patent Application Publication JP S59-66308. Retrieved from http://worldwide.espacenet.com on Jan. 7, 2016.*
International Preliminary Report on Patentability dated Dec. 31, 2014, issued from corresponding PCT/GB2013/051683.

* cited by examiner

*Primary Examiner* — Jason M Greene
(74) *Attorney, Agent, or Firm* — Banner & Witcoff, Ltd.

(57) ABSTRACT

A composite membrane comprising: (a) a porous support; (b) a gutter layer; (c) a discriminating layer having an average thickness of at most 90 nm; and (d) a protective layer having an average thickness 150 nm to 600 nm comprising dialkylsiloxane groups.

18 Claims, No Drawings

COMPOSITE GAS SEPARATION MEMBRANES WITH DIALKYSILOXANE INTERMEDIATE LAYER

RELATED APPLICATION DATA

This application is a National Stage Application under 35 U.S.C. 371 of co-pending PCT application PCT/GB2013/051683 designating the United States and filed Jun. 26, 2013; which claims the benefit of GB application number 1211309.8 and filed Jun. 26, 2012 each of which are hereby incorporated by reference in their entireties.

This invention relates to composite membranes and to their preparation and use for the separation of gases.

Composite gas separation membranes are known U.S. Pat. No. 5,286,280 (280). The '280 membranes comprise, in order, a support, a gas-permeable polymeric layer (often referred to as a "gutter layer"), a discriminating layer and optionally an outer protective layer. The membranes of '280 are quite expensive, partly due to the material costs for the 6FDA-polyimide discriminating layer. '280 teaches that the discriminating layer should have a thickness of at least 100 nm, possibly because a thinner discriminating layer might be less able to perform the crucial task of discriminating between different gases. There is a need for membranes which are not too expensive and yet still discriminate well between gases such as $CO_2$ and $CH_4$.

According to the present invention there is provided a composite membrane comprising:
(a) a porous support;
(b) a gutter layer;
(c) a discriminating layer having an average thickness of at most 90 nm; and
(d) a protective layer of average thickness 150 nm to 600 nm comprising dialkylsiloxane groups.

The composite membranes according to the present invention comprise a thinner discriminating layer than was thought possible in '280. The flux rate of the membrane remains good despite the presence of a protective layer which is much thicker than the discriminating. Furthermore, the $CO_2/CH_4$ selectivity of the membrane remains good and surprisingly may even be improved by the presence of the outer protective layer in conjunction with the unusually thin discriminating layer.

The term "comprising" is to be interpreted as specifying the presence of the stated parts, steps or components, but does not exclude the presence of one or more additional parts, steps or components.

Reference to an element by the indefinite article "a" or "an" does not exclude the possibility that more than one of the element(s) is present, unless the context clearly requires that there be one and only one of the elements. The indefinite article "a" or "an" thus usually means "at least one".

The primary purpose of the support is to provide mechanical strength to the membrane without materially reducing gas flux. Therefore the support is typically open pored (before it is converted into the composite membrane), relative to the discriminating layer.

The support may be, for example, a microporous organic or inorganic membrane, or a woven or non-woven fabric. The support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly (4-methyl 1-pentene) and especially polyacrylonitrile.

One may use a commercially available porous sheet material as the support, if desired. Alternatively one may prepare the support using techniques generally known in the art for the preparation of microporous materials. One may also use a support which has been subjected to a corona discharge treatment, glow discharge treatment, flame treatment, ultraviolet light irradiation treatment or the like, e.g. for the purpose of improving its wettability and/or adhesiveness.

The support preferably possesses pores which are as large as possible, consistent with providing a smooth surface for the gutter layer.

The support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the support typically have an average diameter of 0.001 to 10 μm, preferably 0.01 to 1 μm. The pores at the surface of the support typically have a diameter of 0.001 to 0.1 μm, preferably 0.005 to 0.05 μm. The pore diameter may be determined by, for example, viewing the surface of the support before it is converted to the membrane by scanning electron microscopy ("SEM") or by cutting through the support and measuring the diameter of the pores within the support, again by SEM.

The porosity at the surface of the support may also be expressed as a % porosity, i.e.

$$\% \text{ porosity} = 100\% \times \frac{\text{(area of the surface which is missing due to pores)}}{\text{(total surface area)}}$$

The areas required for the above calculation may be determined by inspecting the surface of the support by SEM. Thus, in a preferred embodiment, the support has a % porosity>1%, more preferably >3%, especially >10%, more especially >20%.

The porosity of the support may also be expressed as a $CO_2$ gas permeance (units are $m^3(STP)/m^2 \cdot s \cdot kPa$). When the membrane is intended for use in gas separation the support preferably has a $CO_2$ gas permeance of 5 to $150 \times 10^{-5}$ $m^3(STP)/m^2 \cdot s \cdot kPa$, more preferably of 5 to 100, most preferably of 7 to $70 \times 10^{-5}$ $m^3(STP)/m^2 \cdot s \cdot kPa$.

Alternatively the porosity may be characterised by measuring the $N_2$ gas flow rate through the support. Gas flow rate can be determined by any suitable technique, for example using a Porolux™ 1000 device, available from Porometer.com. Typically the Porolux™ 1000 is set at the maximum pressure (about 34 bar) and one measures the flow rate (L/min) of $N_2$ gas through the support under test. The $N_2$ flow rate through the support at a pressure of about 34 bar for an effective sample area of 2.69 $cm^2$ (effective diameter of 18.5 mm) is preferably >1 L/min, more preferably >5 L/min, especially >10 L/min, more especially >25 L/min. The higher of these flow rates are preferred because this reduces the likelihood of the gas flux of the resultant membrane being reduced by the support.

The above pore sizes and porosities refer to the support before it has been converted into the composite membrane of the present invention.

The support preferably has an average thickness of 20 to 500 μm, preferably 50 to 400 μm, especially 100 to 300 μm.

The gutter layer is attached to the support and preferably comprises pores having an average diameter<1 nm. The presence of such small pores means that the gutter layer is permeable to gasses, although typically the gutter layer has low ability to discriminate between gases.

The gutter layer preferably has an average thickness 50 to 800 nm, preferably 150 to 700 nm, especially 200 to 650 nm, e.g. 230 to 270 nm, 300 to 360 nm, 380 to 450 nm, 470 to 540 nm or 560 to 630 nm.

Preferably the gutter layer comprises groups which are capable of bonding to a metal, for example by covalent bonding, ionic bonding and/or by hydrogen bonding, preferably by covalent bonding. The identity of such groups depend to some extent on the chemical composition of the gutter layer and the identity of the metal, but typically such groups are selected from epoxy groups, oxetane groups, carboxylic acid groups, amino groups, hydroxyl groups and thiol groups. More preferably the gutter layer comprises a polymer having carboxylic acid groups, epoxy groups or oxetane groups, or a combination of two or more of such groups. Such a polymer may be formed on the support by a process comprising the curing of a radiation-curable composition, especially a curable (e.g. radiation-curable) composition comprising a polymerisable dialkylsiloxane. The latter option is useful for providing gutter layers comprising dialkylsiloxane groups, which are preferred.

The polymerisable dialkylsiloxane is preferably a monomer comprising a dialkylsiloxane group or a polymerisable oligomer or polymer comprising dialkylsiloxane groups. For example, one may prepare the gutter layer from a radiation-curable composition comprising a partially crosslinked, radiation-curable polymer comprising dialkylsiloxane groups, as described in more detail below. Typical dialkylsiloxane groups are of the formula —{O—Si(CH3)2}$_n$- wherein n is at least 1, e.g. 1 to 100. Poly(dialkylsiloxane) compounds having terminal vinyl groups are also available and these may be incorporated into the gutter layer by the curing process.

Preferably the gutter layer is free from groups of formula Si—C$_6$H$_5$.

Irradiation of the radiation-curable composition (sometimes referred to as "curing" in this specification) may be performed using any source which provides the wavelength and intensity of radiation necessary to cause the radiation-curable composition to polymerise and thereby form the gutter layer on the support. For example, electron beam, ultraviolet (UV), visible and/or infra red radiation may be used to irradiate (cure) the radiation-curable composition, with the appropriate radiation being selected to match the components of the composition.

Preferably the discriminating layer comprises a polyimide, cellulose acetate, polyethyleneoxide or polyetherimide, especially a polyimide comprising trifluoromethyl groups.

The discriminating layer preferably has an average thickness 5 to 80 nm, preferably 10 to 70 nm, especially 10 to 60 nm.

In order to form a discriminating layer, one may apply a mixture comprising an inert solvent and a polymer which forms a discriminating layer when the inert solvent evaporates. Typically such a polymer is a polyimide, especially a polyimide having —CF$_3$ groups. Polyimides comprising —CF$_3$ groups may be prepared by, for example, the general methods described in U.S. Pat. Reissue No. 30,351 (based on U.S. Pat. No. 3,899,309) U.S. Pat. No. 4,717,394 and U.S. Pat. No. 5,085,676. Typically one or more aromatic dianhydrides, preferably having —CF$_3$ groups, are condensed with one or more diamines. The diamine(s) and dianhydride(s) copolymerise to form an AB-type copolymer having alternating groups derived from the diamine(s) and dianhydride(s) respectively.

In order to achieve a good adhesion of the discriminating layer to the gutter layer, the composition used to form the discriminating layer preferably comprises a component (e.g. a monomer, oligomer and/or polymer) having groups which are reactive with a surface component of the gutter layer. For example, one of the gutter layer and the discriminating layer comprises epoxy groups, trialkoxysilyl groups and/or oxetane groups and the other comprises groups which are reactive therewith, e.g. carboxylic acid groups, sulphonic acid groups, hydroxyl groups, and/or thiol groups. More preferably the discriminating layer comprises a polymer having carboxylic acid, hydroxyl and/or sulphonic acid groups, most preferably carboxylic acid groups.

Preferably the discriminating layer comprises groups of the Formula (1) wherein Ar is an aromatic group and R is a carboxylic acid group, a sulphonic acid group, a hydroxyl group, a thiol group, an epoxy group or an oxetane group:

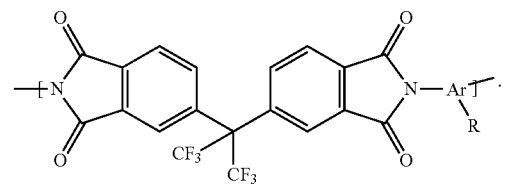

Formula (1)

Preferably the discriminating layer is substantially free of inorganic compounds, e.g. free from zeolites.

The protective layer typically performs the function of providing a scratch and crack resistant layer on top of the discriminating layer and/or sealing any defects present in the discriminating layer.

The protective layer preferably has an average thickness 50 to 800 nm, preferably 150 to 600 nm, especially 200 to 700 nm, more especially 210 to 650 nm, e.g. 230 to 270 nm, 300 to 360 nm, 380 to 450 nm, 470 to 540 nm or 560 to 630 nm.

The thickness of the various layers (e.g. the gutter layer, discriminating layer and protective layer) may be determined by cutting through the membrane and examining its cross section by SEM. The part of the gutter layer which is present within the pores of the support is not taken into account.

The protective layer preferably comprises pores of average diameter<1 nm.

The protective layer optionally has surface characteristics which influence the functioning of the composite membrane, for example by making the membrane surface more hydrophilic.

In a preferred embodiment the gutter layer and the protective layer are obtained from curable compositions which comprise the same components. This leads to efficiencies in manufacturing and raw material costs. Preferably the amount of each component used to make the protective layer is within at most 10%, more preferably within at most 5%, of the amount of the same component used to make the gutter layer. For example, if the gutter layer comprises 30 wt % of a particular component, then preferably the protective layer comprises 27 to 33 wt % (i.e. +/−10%), more preferably 28.5 wt % to 31.5 wt % (i.e. +/−5%), of that same component.

In another embodiment the protective layer comprises a polyamine and the discriminating layer comprises carboxylic acid groups. This embodiment is preferred because the attraction between the amine groups in the polyamine and the carboxylic acid groups can enhance the adhesion of the protective layer to the discriminating layer.

Thus the composite gas separation membrane according to the invention is preferably prepared in such a way that carboxylic acid groups present in the discriminating layer are reacted with amine groups present in the protective layer. Such a reaction may be performed under mild conditions if desired. Typically, when the protective layer comprises a polyamine and the discriminating layer comprises carboxylic acid groups, the composite membrane is heated in order to form non-covalent bonds between the amine groups of the polyamine and the carboxylic acid groups, e.g. to a temperature of up to 49° C., more preferably up to 45° C., especially at temperature in the range 5 to 40° C., more especially 10 to 30° C.

The gutter layer and the protective layer are preferably each independently obtained from a curable composition comprising:
(1) 0.5 to 25 wt % of radiation-curable component(s), at least one of which comprises dialkylsiloxane groups;
(2) 0 to 5 wt % of a photo-initiator;
(3) 70 to 99.5 wt % of inert solvent; and
(4) 0.01 to 5 wt % of metal complex;
wherein the composition has a molar ratio of metal:silicon of at least 0.0005.

Preferably the composition (and the resultant gutter layer and protective layer) has a molar ratio of metal:silicon of 0.001 to 0.1, more preferably 0.003 to 0.03.

Preferably the radiation-curable composition used to form the gutter layer and/or gutter layer comprises 0.02 to 0.6 mmol (more preferably 0.03 to 0.3 mmol) of component (4) per gram of component (1).

The radiation-curable component(s) of component (1) typically comprise at least one radiation-curable group. Radiation curable groups include ethylenically unsaturated groups (e.g. (meth)acrylic groups (e.g. $CH_2=CR^1—C(O)—$ groups), especially (meth)acrylate groups (e.g. $CH_2=CR^1—C(O)O—$ groups), (meth)acrylamide groups (e.g. $CH_2=CR^1—C(O)NR^1—$ groups), wherein each $R^1$ independently is H or $CH_3$) and especially oxetane or epoxide groups (e.g. glycidyl and epoxycyclohexyl groups).

The amount of radiation-curable component(s) present in the radiation-curable composition (i.e. component (1)) is preferably 1 to 20 wt %, more preferably 2 to 15 wt %. In a preferred embodiment, component (1) of the radiation-curable composition comprises a partially crosslinked, radiation-curable polymer comprising dialkylsiloxane groups.

Photo-initiators may be included in the radiation-curable composition and are usually required when the curing uses UV radiation. Suitable photo-initiators are those known in the art such as radical type, cation type or anion type photo-initiators.

Cationic photo-initiators are preferred when the radiation-curable component(s) comprises curable groups such as epoxy, oxetane, other ring-opening heterocyclic groups or vinyl ether groups.

Preferred cationic photo-initiators include organic salts of non-nucleophilic anions, e.g. hexafluoroarsinate anion, antimony (V) hexafluoride anion, phosphorus hexafluoride anion, tetrafluoroborate anion and tetrakis(2,3,4,5,6-pentafluorophenyl)boranide anion. Commercially available cationic photo-initiators include UV-9380c, UV-9390c (manufactured by Momentive performance materials), UVI-6974, UVI-6970, UVI-6990 (manufactured by Union Carbide Corp.), CD-1010, CD-1011, CD-1012 (manufactured by Sartomer Corp.), Adekaoptomer™ SP-150, SP-151, SP-170, SP-171 (manufactured by Asahi Denka Kogyo Co., Ltd.), Irgacure™ 250, Irgacure™ 261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more.

Radical Type I and/or type II photo-initiators may also be used when the curable group comprises an ethylenically unsaturated group, e.g. a (meth)acrylate or (meth)acrylamide.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

The amount of photo-initiator present in the radiation-curable composition (i.e. component (2)) is preferably 0.005 to 2 wt %, more preferably 0.01 to 1 wt %.

Preferably the weight ratio of component (2) to (1) in the radiation-curable composition is between 0.001 and 0.2 to 1, more preferably between 0.002 and 0.1 to 1. A single type of photo-initiator may be used but also a combination of several different types.

When no photo-initiator is included in the radiation-curable composition, the composition can be advantageously cured by electron-beam exposure. Preferably the electron beam output is between 50 and 300 keV. Curing can also be achieved by plasma or corona exposure.

The function of the inert solvent (3) is to provide the radiation-curable composition with a viscosity suitable for the particular method used to apply the curable composition to the support. For high speed application processes one will usually choose an inert solvent of low viscosity. Examples of suitable inert solvents are mentioned above in relation to preparation of the PCP Polymer.

The amount of inert solvent present in the radiation-curable composition (i.e. component (3)) is preferably 70 to 99.5 wt %, more preferably 80 to 99 wt %, especially 90 to 98 wt %.

Inert solvents are not radiation-curable.

The metal complex included in the radiation-curable composition as component (4) can provide the necessary metal in that composition and in the protective layer.

The metal is preferably selected from the groups 2 to 16 of the periodic table (according the IUPAC format), including transition metals. Examples of such metals include: Be, Mg, Ca, Sr, Ba, Sc, Y, La, Ce, Pr, Nd, Pm, Sm, Eu, Gd, Tb, Dy, Ho, Er, Tm, Yb, Lu, Ti, Zr, Hf, V, Nb, Ta, Cr, Mo, W, Mn, Re, Fe, Ru, Os, Co, Rh, Ir, Ni, Pd, Pt, Cu, Zn, Cd, B, Al, Ga, In, Tl, Si, Ge, Sn, Pb, As, Sb, Bi, Se, Te. More preferred are Mg, Ca, Sr, Ba, Sc, Y, La, Ce, Pr, Nd, Sm, Gd, Dy, Ho, Er, Tm, Yb, Ti, Zr, Hf, V, Nb, Ta, Cr, Mo, W, Mn, Fe, Ru, Co, Ir, Ni, Zn, B, Al, Ga, In, Si, Ge, Sn, As, Sb, Bi, Se and Te and mixtures comprising two or more thereof (the phrase "a metal" is not intended to be limited to just one metal and includes the possibility of two or more metals being present). Preferably the metal is not platinum.

From commercial availability point of view, metals from the groups 3, 4, 13 and/or 14 of the periodic table are preferred, more preferably Ti, Zr, Al, Ce and Sn, especially Ti, Zr and Al.

The metal preferably has a positive charge of at least two, more preferably the metal is trivalent (charge of $3^+$), tetravalent (charge of $4^+$) or pentavalent (charge of $5^+$), The metal complex, when used, may also comprise two or more different metal ions, e.g. as in barium titanium alkoxide, barium yttrium alkoxide, barium zirconium alkoxide, aluminum yttrium alkoxide, aluminum zirconium alkoxide, aluminum titanium alkoxide, magnesium aluminum alkoxide and aluminum zirconium alkoxide, The metal complex preferably comprises a metal (e.g. as described above) and a halide or an organic ligand, for example an organic ligand comprising one or more donor atoms which co-ordinate to the metal. Typical donor atoms are oxygen, nitrogen and sulphur, e.g. as found in hydroxyl, carboxyl, ester, amine, azo, heterocyclic, thiol, and thioalkyl groups.

The ligand(s) may be monodentate or multidentate (i.e. the ligand has two or more groups which co-ordinate with the metal).

In a particularly preferred embodiment the metal complex comprises a metal and an organic ligand comprising an alkoxide or an optionally substituted 2,4-pentanedionate group and/or a carboxyl group (e.g. a neodecanoate group).

The metal complex may also comprise one or more inorganic ligands, in addition to the organic ligand(s), and optionally one or more counterions to balance the charge on the metal. For example the metal complex may comprise a halide (e.g. chloride or bromide) or water ligand.

Preferably the metal complex has a coordination number of 2 to 6, more preferably 4 to 6 and especially 4 or 6.

Preferably the curable composition comprises 0.01 to 5 wt %, more preferably 0.01 to 2 wt %, especially 0.02 to 1 wt % of metal complex.

The curable composition may contain other components, for example surfactants, surface tension modifiers, viscosity enhancing agents, biocides and/or other components capable of co-polymerisation with the other ingredients.

According to a second aspect of the present invention there is provided a process for preparing a composite membrane according to the first aspect of the present invention comprising the steps of:

a. applying a composition to a porous support and curing the composition to form the gutter layer;
b. applying a composition to the gutter layer to form the discriminating layer having an average thickness of up to 90 nm; and
c. applying a composition to the discriminating layer and curing the composition to form the protective layer having an average thickness 150 nm to 600 nm comprising dialkylsiloxane groups.

For convenience, the composition used in step a. is hereinafter referred to as the first composition, the composition used in step b. is hereinafter referred to as the second composition and the composition used in step c. is hereinafter referred to as the third composition.

The first and third composition preferably comprises the same components. Also the amount of each component present in the first composition (used to make the protective layer) is within at most 10% of the amount of the same component present in the third composition (used to make the gutter layer). In a particularly preferred embodiment the first and third composition are identical.

The first, second and third compositions may be applied by any suitable coating technique, for example by curtain coating, meniscus type dip coating, kiss coating, pre-metered slot die coating, reverse or forward kiss gravure coating, multi roll gravure coating, spin coating and/or slide bead coating. The technique used to apply each of the compositions may be different, although preferably the same technique is used for all three.

Conveniently the compositions are applied by a multilayer coating method, for example using a consecutive multilayer coating method.

In a preferred consecutive multilayer process the first, second and third compositions are applied consecutively to the support, preferably with curing steps being applied between application of the first and second composition, after application of the third composition and optionally between application of the second and third composition (e.g. when the second composition is a curable composition). In this way, one may cure the first curable composition to form the gutter layer before the second composition is applied, one may cure the third composition to form the protective layer, and when the second composition is curable, one may cure the second composition to form the discriminating layer before the third curable composition is applied.

The second composition is optionally curable or non-curable, for example the second composition optionally comprises a film-forming material and a solvent. When the second composition is non-curable and comprises a film-forming material and a solvent, it is preferred that step b. further comprises the step of removing some or all of the solvent from the second composition thereby forming the discriminating layer, e.g. by heating and/or drying.

The second and third compositions are preferably radiation-curable compositions. Optionally the second composition is curable, e.g. radiation-curable.

Preferably irradiation to cure the compositions begins within 7 seconds, more preferably within 5 seconds, most preferably within 3 seconds, of the composition being applied to the support, the gutter layer or the discriminating layer, as the case may be.

Suitable sources of UV radiation include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are UV emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

Irradiation in order to cure the compositions may be performed before, during each step of the process. For example, one may apply the first composition to the support and then irradiate the composition to form the gutter layer on the support. One may then apply the second composition to the gutter layer and then form the discriminating by forming a film from the second composition, e.g. by evaporating solvent from the second composition and/or curing the second composition, e.g. thermally or by irradiation. One may then apply the third composition to the discriminating layer and then irradiate the third composition to form the protective layer on the discriminating layer. Alternatively, one may apply the compositions simultaneously to the support in a layer-wise manner and then cure them, e.g. by irradiating and optionally heating and/or drying the coated support to form all layers simultaneously.

In order to produce a sufficiently flowable composition for use in a high speed coating machine, the compositions preferably have a viscosity below 4000 mPa·s when measured at 25° C., more preferably from 0.4 to 1000 mPa·s when measured at 25° C. Most preferably the viscosity of the curable compositions is from 0.4 to 500 mPa·s when measured at 25° C. For coating methods such as slide bead coating the preferred viscosity is from 1 to 100 mPa·s when measured at 25° C. The desired viscosity is preferably achieved by controlling the amount of solvent in the curable compositions and/or by appropriate selection of the components of the curable composition and their amounts.

With suitable coating techniques, coating speeds of at least 5 m/min, e.g. at least 10 m/min or even higher, such as 15 m/min, 20 m/min, or even up to 100 m/min, can be reached. In a preferred embodiment the compositions are applied to the support at the aforementioned coating speeds.

The thickness of the protective layer may be influenced by controlling the amount of third composition per unit area applied to the discriminating layer. For example, as the amount of third composition per unit area increases, so does the thickness of the resultant protective layer. An analogous principle applies to formation of the discriminating layer and protective layer.

While it is possible to prepare the membranes of the invention on a batch basis with a stationary support, it is much preferred to prepare them on a continuous basis using a moving support, e.g. the support may be in the form of a roll which is unwound continuously or the support may rest on a continuously driven belt. Using such techniques the compositions used to form the various layers can be applied on a continuous basis or they can be applied on a large batch basis. Removal of any inert solvent present in the composition(s) can be accomplished at any stage after the radiation-curable composition has been applied to the support, e.g. by evaporation or drying.

Thus in a preferred process for making the membranes of the invention, the compositions are applied continuously to the support by means of a manufacturing unit comprising one or more composition application stations, one or more curing stations and a composite membrane collecting station, wherein the manufacturing unit comprises a means for moving the support from the first to the last station (e.g. a set of motor driven pass rollers guiding the support through the coating line). The manufacturing unit optionally comprises one composition application station which applies the first, second and third curable compositions, e.g. a slide bead coater. The unit optionally further comprises one or more drying stations, e.g. for forming the discriminating layer and/or drying the final composite membrane.

Preferably the process further comprises the step of activating the gutter layer using a corona treatment (e.g. atmospheric or vacuum), a plasma treatment, flame treatment and/or ozone treatment. For the corona or plasma treatments, generally an energy dose of 0.5 to 100 kJ/m$^2$ is sufficient, for example about 1, 3, 5, 8, 15, 25, 45, 60, 70 or 90 kJ·m$^2$.

In a preferred process, steps a., b. and c. are performed consecutively and in that order.

The gutter layer comprising dialkylsiloxane groups preferably performs the function of providing a smooth and continuous surface for the discriminating layer.

If desired, one may prevent the composition used to form the gutter layer from permeating too deeply into the support by any of a number of techniques. For example, one may select a composition which has a sufficiently high viscosity to make such permeation unlikely. With this in mind, the curable composition used to form the gutter layer preferably has a viscosity of 0.1 to 500 Pa·s at 25° C., more preferably 0.1 to 100 Pa·s at 25° C. Alternatively, the process optionally comprises the step of filling the pores of the support with an inert (i.e. non-curable) liquid before applying the curable composition used to form the gutter layer. This technique has an advantage over the first technique mentioned above in that one may form thinner membranes and more application techniques are available for compositions of lower viscosity.

The composite membrane is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

Optionally the composite membrane comprises layers in addition to the aforementioned gutter layer, discriminating layer and protective layers. Such additional layers may be applied using analogous techniques disclosed herein for the gutter layer, discriminating layer and protective layers.

According to a third aspect of the present invention there is provided a gas separation cartridge comprising a composite membrane according to the first aspect of the present invention.

A still further aspect of the present invention provides a gas separation module for separating a feed gas containing a target gas into a gas stream rich in the target gas and a gas stream depleted in the target gas, the module comprises a housing and one or more cartridges comprising a composite membrane according to the first aspect of the present invention.

Preferred gas separation modules comprise a composite membrane according to the present invention are in the form of a spiral-wound cartridge. Such spiral-wound cartridges preferably comprise spacers and outer impermeable support layers, the spacers being positioned on each side of the membrane and between the membrane and the impermeable support layer and thereby defining a feed channel on one side of the membrane and a permeate channel on the other side of the membrane, wherein the membrane, spacers and outer impermeable layers are wound in a spiral manner around a core.

While this specification emphasises the usefulness of the membranes of the present invention for separating gases, especially polar and non-polar gases, it will be understood that the membranes can also be used for other purposes, for example providing a reducing gas for the direct reduction of iron ore in the steel production industry, dehydration of organic solvents (e.g. ethanol dehydration), pervaporation, oxygen enrichment, solvent resistant nanofiltration and vapour separation.

The composite membranes are particularly suitable for separating a feed gas containing a target gas into a gas stream rich in the target gas and a gas stream depleted in the target gas. For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_R$, relative to non-polar gases, e.g. alkanes, $H_2$, $N_2$, and water vapour.

The target gas may be, for example, a gas which has value to the user of the membrane and which the user wishes to collect. Alternatively the target gas may be an undesirable gas, e.g. a pollutant or 'greenhouse gas', which the user wishes to separate from a gas stream in order to meet product specification or to protect the environment.

Preferably the composite membrane has a $CO_2/CH_4$ selectivity ($\alpha CO_2/CH_4$)>10. Preferably the selectivity is determined by a process comprising exposing the membrane to a 13/87 mixture by volume of $CO_2$ and $CH_4$ at a feed pressure of 6000 kPa at 40° C.

EXAMPLES

The following materials were used in the Examples (all without further purification):

PAN is a support (polyacrylonitrile L10 ultrafiltration membrane from GMT Membrantechnik GmbH, Germany).

X-22-162C is a dual end reactive silicone having carboxylic acid reactive groups, a viscosity of 220 mm²/s and a reactive group equivalent weight of 2,300 g/mol] from Shin-Etsu Chemical Co., Ltd. (MWT 4,600).

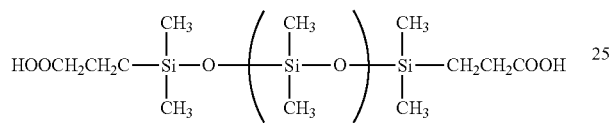

X-22-162c

DBU is 1,8-diazabicyclo[5.4.0]undec-7-ene from Sigma Aldrich.

UV9300 is SilForce™ UV9300 from Momentive Performance Materials Holdings having an epoxy equivalent weight of 950 g/mole oxirane (MWT 9,000, determined by viscometry).

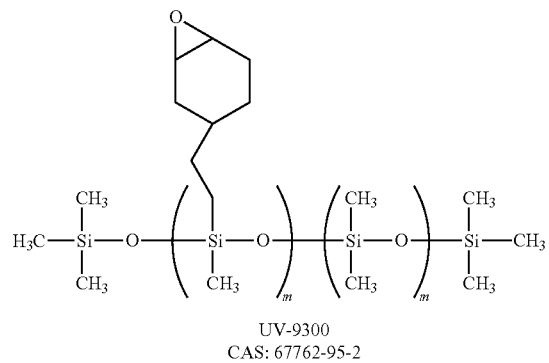

UV-9300
CAS: 67762-95-2

I0591 4-isopropyl-4'-methyldiphenyliodoniumtetrakis(pentafluorophenyl) borate ($C_{40}H_{18}BF_{20}I$) from Tokyo Chemical Industries N.V. (Belgium)

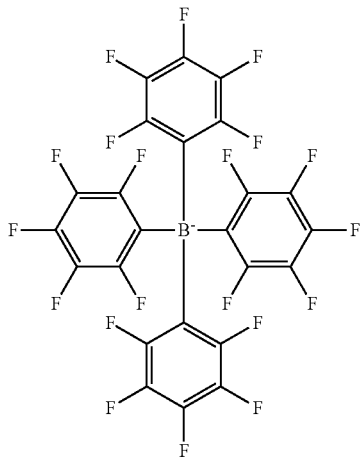

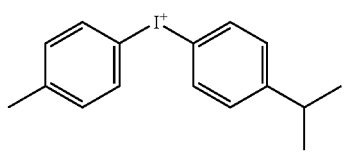

Ti(OiPr)$_4$ is titanium (IV) isopropoxide from Dorf Ketal Chemicals (MWT 284).

n-heptane is n-heptane from Brenntag Nederland BV.

MEK is 2-butanone from Brenntag Nederland BV.

MIBK is methylisobutyl ketone from Brenntag Nederland BV.

APTMS is 3-trimethoxysilylpropan-1-amine from Sigma Aldrich.

THF is tetrahydrofuran from Brenntag Nederland BV.

PI1 is 6FDA-TeMPD$_x$/DABA$_y$, x/y=20/80; obtained from Fujifilm Corporation, having the following structure:

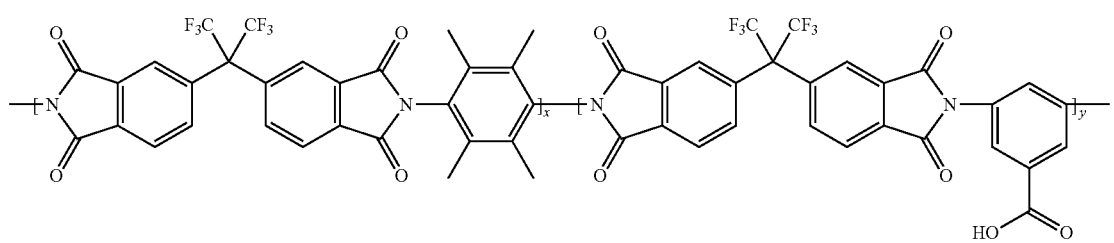

Evaluation of Gas Flux and Selectivity (A) Gas Flux

The flux of $CH_4$ and $CO_2$ through the membranes was measured at 40° C. and gas feed pressure of 6000 kPa using a gas permeation cell with a measurement diameter of 3.0 cm and a feed gas composition of 13 v/v % $CO_2$ and 87 v/v % $CH_4$.

The flux of each gas was calculated based on the following equation:

$$Q_i = (\theta_{Perm} \cdot X_{Perm,i}) / (A \cdot (P_{Feed} \cdot X_{Feed,i} - P_{Perm} \cdot X_{Perm,i}))$$

Where:
$Q_i$=Flux of each gas (m³(STP)/m²·kPa·s)
$\theta_{Perm}$=Permeate flow (m³(STP)/s)
$X_{Perm,i}$=Volume fraction of each gas in the permeate
A=Membrane area (m²)
$P_{Feed}$=Feed gas pressure (kPa)
$X_{Feed,i}$=Volume fraction of each gas in the feed
$P_{perm}$=Permeate gas pressure (kPa)

STP is standard temperature and pressure, which is defined here as 25.0° C. and 1 atmosphere (101.325 kPa).

(B) Selectivity

The selectivity ($\alpha_{CO2/CH4}$) for the membranes was calculated from $Q_{CO2}$ and $Q_{CH4}$ calculated above, based on following equation:

$$\alpha_{CO2/CH4} = Q_{CO2}/Q_{CH4}$$

Preparation of Radiation-Curable Polymers PCP1 Comprising Dialkylsiloxane Groups The components UV9300, X-22-162C and DBU dissolved in n-heptane in the amounts indicated in Table 1 and maintained at a temperature of 95° C. for 168 hours. The resultant polymer, PCP1, had an Si content (meq/g polymer) of 12.2 and the resultant solution of PCP1 had a viscosity of 22.8 mPas at 25.0° C.

TABLE 1

Ingredients used to Prepare PCP1

| Ingredient | Amount (w/w %) |
| --- | --- |
| UV9300 (w/w %) | 39.078 |
| X-22-162C (w/w %) | 10.789 |
| DBU (w/w %) | 0.007 |
| n-Heptane (w/w %) | 50.126 |

Preparation of the Curable Composition Used to Provide the Gutter and Protective Layers The solution of PCP1 arising from the previous step above was cooled to 20° C. and diluted using n-heptane to give the PCP1 concentration indicated in Table 2 below. The solution was then filtered through a filter paper having a pore size of 2.7 μm. The photoinitiator I0591 and a metal complex (Ti(OiPr)$_4$) were then added in the amounts indicated in Table 2 to give curable composition C1. The amount of Ti(OiPr)$_4$ present in C1 corresponded to 105.6 μmol of Ti(OiPr)$_4$ per gram of PCP1. Also the molar ratio of metal:silicon in C1 was 0.0087.

TABLE 2

Preparation of Curable Composition C1

| Ingredient | Amount (w/w %) |
| --- | --- |
| PCP1 | 5.0 |
| I0591 | 0.1 |
| Ti(OiPr)$_4$ | 0.15 |

C1 was used to prepare both the gutter layer and the protective layer, as described in more detail below.

Step a. Formation of the Gutter Layer

C1 was applied to a support (PAN) by spin coating and subsequently cured using a Light Hammer LH10 from Fusion UV Systems fitted with a D-bulb with an intensity of 24 kW/m and dried. This resulted in a support having a gutter layer of thickness 600 nm, comprising a metal complex and dialkylsiloxane groups. The gutter layer thickness was verified by cutting through the PAN+gutter layer composite and measuring the thickness from the surface of the PAN support outwards by SEM.

Step b. Formation of the Discriminating Layer

The composition C2 used to prepare the discriminating layer was prepared by mixing the ingredients indicated in Table 3:

TABLE 3

| Ingredient | Parts (w/w %) |
| --- | --- |
| PI1 | 1.50 |
| APTMS | 0.015 |
| MIBK | 4.50 |
| THF | 7.485 |
| MEK | 86.50 |

A discriminating layer was formed on the gutter layer by the composition C2 described in Table 3 thereto by spin coating. A series of PAN+gutter layer+discriminating layer composites was prepared having different discriminating layer thicknesses of 50 nm, 65 nm or 90 nm. The thicknesses were verified by cutting through the membrane and measuring the thickness from the surface of the gutter layer outwards by SEM or by ellipsometry.

Step c. Formation of the Protective Layer

The radiation-curable composition C1 described in Table 1 was applied by spin coating to the PAN+gutter layer+discriminating layer composites arising from step b. The composition was cured thereon using a Light Hammer LH10 from Fusion UV Systems fitted with a D-bulb with an intensity of 24 kW/m and dried. This resulted in composite membranes according to the present invention.

A series of membranes according to the invention was prepared having different thicknesses of protective layer (i.e. 200 nm, 300 nm or 600 nm thickness). The protective layer thickness was measured by cutting through the composite membrane and measuring the thickness of the outermost layer from the surface of the discriminating layer by SEM or by ellipsometry.

The resultant composite membranes had the gutter layer thickness, $Q_{CO2}$ and selectivity indicated in Tables 4 and 5 below:

TABLE 4

| | CEX 1 | CEX 2 | EX 1 | EX 2 | EX 3 |
| --- | --- | --- | --- | --- | --- |
| Protective Layer Thickness | No Protective Layer | | | 200 nm | |
| Discriminating Layer Thickness | 65 nm | 50 nm | 90 nm | 65 nm | 50 nm |
| Gutter Layer Thickness | 600 nm | 600 nm | 600 nm | 600 nm | 600 nm |

TABLE 4-continued

| | CEX 1 | CEX 2 | EX 1 | EX 2 | EX 3 |
|---|---|---|---|---|---|
| Selectivity ($\alpha CO_2/CH_4$) | 25.6 | 25.0 | 27.7 | 26.5 | 25.8 |
| $CO_2$ flux (M3/ms · kPa · s) | 6.5E−07 | 6.65E−07 | 5.42E−07 | 5.66E−07 | 5.88E−07 |

TABLE 5

| | EX 4 | EX 5 | EX 6 | EX 7 | EX 8 | EX 9 |
|---|---|---|---|---|---|---|
| Protective Layer Thickness | | 300 nm | | | 600 nm | |
| Discriminating Layer Thickness | 90 nm | 65 nm | 50 nm | 90 nm | 65 nm | 50 nm |
| Gutter Layer Thickness | 600 nm | 600 nm | 600 nm | 600 nm | 600 nm | 600 nm |
| Selectivity ($\alpha CO_2/CH_4$) | 29.8 | 29.6 | 28.0 | 29.6 | 29.1 | 28.1 |
| $CO_2$ flux (M3/ms · kPa · s) | 5.21E−07 | 5.41E−07 | 5.82E−07 | 5.02E−07 | 5.36E−07 | 5.37E−07 |

(Note: CEX means Comparative Example and EX means Example)

The invention claimed is:

1. A composite gas separation membrane comprising:
    (a) a porous support;
    (b) a gutter layer;
    (c) a discriminating layer having an average thickness of at most 90 nm; and
    (d) a protective layer having an average thickness 150 nm to 600 nm comprising dialkylsiloxane groups;
    wherein:
        (i) the discriminating layer is formed from a composition comprising a component having groups which are reactive with a surface component of the gutter layer;
        (ii) the gutter layer comprises dialkylsiloxane groups;
        (iii) the discriminating layer comprises a polyimide, cellulose acetate, polyethyleneoxide, or polyetherimide; and
        (iv) one of the gutter layer and the discriminating layer comprises epoxy groups, trialkoxysilyl groups, oxetane groups, or a combination thereof, and the other comprises groups which are reactive therewith selected from the group consisting of carboxylic acid groups, sulphonic acid groups, hydroxyl groups, thiol groups, and a combination thereof.

2. The composite gas separation membrane according to claim 1, wherein the discriminating layer comprises a polymer having groups selected from the group consisting of carboxylic acid, hydroxyl, sulphonic acid, and a combination thereof, and the gutter layer comprises epoxy groups, trialkoxysilyl groups, oxetane groups, or a combination thereof.

3. The composite gas separation membrane according to claim 1, wherein the total thickness of the gutter layer, discriminating layer and protective layer is 1500 nm or less.

4. A composite gas separation membrane comprising:
    (a) a porous support;
    (b) a gutter layer;
    (c) a discriminating layer having an average thickness of at most 90 nm; and
    (d) a protective layer having an average thickness 150 nm to 600 nm comprising dialkylsiloxane groups;
    wherein:
        (i) the discriminating layer is formed from a composition comprising a component having groups which are reactive with a surface component of the gutter layer;
        (ii) the gutter layer and the protective layer each comprise an alkoxysilane group;
        (iii) one of the gutter layer and the discriminating layer comprises epoxy groups, trialkoxysilyl groups, oxetane groups, or a combination thereof, and the other comprises groups which are reactive therewith selected from the group consisting of carboxylic acid groups, sulphonic acid groups, hydroxyl groups, thiol groups, and a combination thereof; and
        (iv) the discriminating layer comprises a polyimide comprising trifluoromethyl groups.

5. A process for preparing a composite gas separation membrane according to claim 1, comprising the steps of:
    a. applying a composition to the porous support and curing the composition to form the gutter layer;
    b. applying a composition to the gutter layer to form the discriminating layer having an average thickness of up to 90 nm; and
    c. applying a composition to the discriminating layer and curing the composition to form the protective layer having an average thickness 150 nm to 600 nm comprising dialkylsiloxane groups;
    wherein the composition used to form the gutter layer comprises:
        (1) 0.5 to 25 wt % of radiation-curable component(s), at least one of which comprises dialkylsiloxane groups;
        (2) 0 to 5 wt % of a photo-initiator;
        (3) 70 to 99.5 wt % of inert solvent; and
        (4) 0.01 to 5 wt % of metal complex;
    wherein the composition has a molar ratio of metal:silicon of at least 0.0005.

6. The process according to claim 5 wherein the composition applied in step c. comprises the same components as the composition used in step a.

7. The process according to claim 6 wherein the amount of each component present in the composition used in step c. is within at most 10% of the amount of the same component present in the composition used in step a.

8. The process according to claim 5 wherein the composition used in step c. is identical to the composition used in step a.

9. The process according to claim 5 wherein the composition referred to in step a. is cured to form the gutter layer before the composition referred to in step b. is applied, the composition referred to in step b. is cured, dried, or both, to form the discriminating layer before the composition referred to in step c. is applied, and the composition referred to in step c. is cured to form the protective layer.

10. A gas separation cartridge comprising a composite gas separation membrane according to claim 1.

11. The composite membrane according to claim 4 wherein the discriminating layer has an average thickness of up to 60 nm and the total thickness of the gutter layer, discriminating layer and protective layer is 1500 nm or less.

12. The process according to claim 6 wherein the composition referred to in step a. is cured to form the gutter layer before the composition referred to in step b. is applied, the composition referred to in step b. is cured, dried, or both to form the discriminating layer before the composition referred to in step c. is applied, and the composition referred to in step c. is cured to form the protective layer.

13. The process according to claim 7 wherein the composition referred to in step a. is cured to form the gutter layer before the composition referred to in step b. is applied, the composition referred to in step b. is cured, dried, or both, to form the discriminating layer before the composition referred to in step c. is applied, and the composition referred to in step c. is cured to form the protective layer.

14. The process according to claim 8 wherein the composition referred to in step a. is cured to form the gutter layer before the composition referred to in step b. is applied, the composition referred to in step b. is cured, dried, or both, to form the discriminating layer before the composition referred to in step c. is applied, and the composition referred to in step c. is cured to form the protective layer.

15. A gas separation cartridge comprising a composite gas separation membrane according to claim 4.

16. A gas separation cartridge comprising a composite gas separation membrane according to claim 11.

17. The composite gas separation membrane according to claim 1 wherein the compositions used to form the gutter layer and the protective layer each independently comprise:
   (1) 0.5 to 25 wt % of radiation-curable component(s), at least one of which comprises dialkylsiloxane groups;
   (2) 0 to 5 wt % of a photo-initiator;
   (3) 70 to 99.5 wt % of inert solvent; and
   (4) 0.01 to 5 wt % of metal complex;
   wherein the composition has a molar ratio of metal:silicon of at least 0.0005.

18. The composite gas separation membrane according to claim 1, wherein the discriminating layer comprises a polyimide comprising trifluoromethyl groups.

* * * * *